United States Patent [19]

Adams

[11] Patent Number: 4,529,343
[45] Date of Patent: Jul. 16, 1985

[54] CONTOUR FORMING SYSTEM

[76] Inventor: Floyd J. Adams, 6320 W. Medlock, Glendale, Ariz. 85301

[21] Appl. No.: 507,673

[22] Filed: Jun. 24, 1983

[51] Int. Cl.³ .............................................. B27C 5/10
[52] U.S. Cl. ................................ 409/182; 144/134 D; 409/178
[58] Field of Search ............... 409/182, 175, 176, 177, 409/178, 179, 180, 181, 121, 126, 138, 139; 144/134 D, 136 C; 51/170 PT, 170 T, 170 R; 33/27 C, 27 D, 41 E, 42; 408/200, 241 A

[56] References Cited

U.S. PATENT DOCUMENTS

| | | | |
|---|---|---|---|
| 2,717,013 | 9/1955 | Van Zwalenburg | 144/253 |
| 2,839,107 | 6/1958 | Emmons | 144/134 D X |
| 2,878,842 | 3/1959 | Pickersgill | 144/134 D |
| 2,935,102 | 5/1960 | Potter | 144/134 D |
| 3,114,292 | 12/1963 | Harris et al. | 409/178 X |
| 3,442,309 | 5/1969 | Sentsch | 409/182 X |
| 3,494,394 | 2/1970 | Stock | 409/138 |
| 4,027,575 | 6/1977 | White | 409/182 X |
| 4,041,997 | 8/1977 | Selfe | 409/182 X |
| 4,044,805 | 8/1977 | Gronholtz | 409/182 |
| 4,102,370 | 7/1978 | Vess | 409/182 X |
| 4,143,691 | 3/1979 | Robinson | 144/134 D |
| 4,291,735 | 9/1981 | Silken | 144/136 C |
| 4,353,672 | 10/1982 | Smith | 409/97 |

Primary Examiner—William R. Briggs
Assistant Examiner—Glenn L. Webb
Attorney, Agent, or Firm—Nelson & Roediger

[57] ABSTRACT

A method and apparatus for forming a wall irregularity following countertop are disclosed wherein a countertop as originally manufactured is disposed on the counter base and against the adjoining wall, is then parallelly shifted away from the adjoining wall by a predetermined amount and a router with a spacer following the wall irregularities is moved along the countertop edge with the cutting edge of the counter cutting tool moving along the countertop edge while the spacer follows along the wall.

The spacer includes a wall following ring element supported by ball bearings on a disk member attached to the bottom of the router. The disk member has a central opening for receiving the router cutting tool.

3 Claims, 7 Drawing Figures

CONTOUR FORMING SYSTEM

BACKGROUND OF THE INVENTION

The invention relates to a contour forming system, method and/or apparatus. It relates to a solution to the problem of forming the edge of one surface to interfit with the variations of contour of a second surface, more particularly for forming the edge of a countertop, for example, to the variations in the surface of a wall against which the countertop is to be mounted.

It is an object of the invention to provide an improved system, method and/or apparatus of this nature.

One of the problems faced by carpenters or cabinet makers during house construction, or the like, is the problem of forming the kitchen countertop to fit precisely against the surface of the wall against which the countertop is to be disposed. The problem arises in part because the countertop is a rigid member formed elsewhere which then has to be installed against the wall surface. The wall surface itself is not perfectly plumb or flat. Rather, because it is usually formed of plaster or other soft material which has the usual small variations or undulations in it as a result of the forming process.

Such preformed rigid countertops usually come with a scribe strip at the edge which is sanded off in a trial and error method of fitting that surface of the countertop to the adjoining wall surface.

One other method of doing this involves using a fixed divider which is run along the wall surface with one member while the other one makes a mark on the scribe surface of the countertop. The edge of the countertop is then sanded off in accordance with the scribe mark thereon. While this is better than the original simple trial and error method, it nevertheless is a hand operation and at least partly is still a trial and error method.

It is a further object of the invention to provide an improved method, system and/or apparatus to overcome these objections of the prior art.

BRIEF DESCRIPTION OF THE INVENTION

It is further object of the invention to provide a method whereby an ordinary router may be used for, in effect, machine forming the edge of a rigid countertop so that it will interfit with the wall surface against which the countertop is to be mounted. The router is provided with a rotating guide or spacer so that the cutting edge of the router tool may be disposed away from the wall surface by a fixed amount at any location.

In using such a rotating guide router the countertop is disposed on the counter base to which it is ultimately to be attached and is moved toward and against the wall. The countertop is then moved away from the wall a proper distance based upon the radius of the spacer and the diameter of the router cutting tool. In the proper location the countertop is then clamped to the counter base to hold it firmly, and the router is moved along the exposed counter edge with the edge of the spacer in contact with the wall. Thus, as the router is moved along the wall the spacer follows the undulations or contour of the wall, and in so doing cuts the edge of the counter in conformance with the wall variations. After this is done the countertop may of course be disposed up against the wall in the completely interfitting aspect and is then screwed or otherwise attached to the counter base.

In carrying out the invention according to one form, there is provided a routing system for fitting the edge of a first surface to the variations of contour of a second surface comprising the steps of providing a supporting structure for the first surface adjacent the second surface, disposing the first surface on the supporting structure but spaced from the second surface by an amount dependent on the spacing and the cutting radius of the router, providing a router including a contour following element and cutting tool having a predetermined cutting radius between the cutting edge of the cutting tool and the following edge of the contour following element, and moving the router with its cutting tool along the edge of the first surface and the contour following element in contact with the contour of the second surface.

In carrying out the invention according to a further form there is provided a contour follower for a router comprising a disk member for attachment to the bottom portion of a router, an opening in the center of said disk member for a router cutting tool, a contour following ring member surrounding the disk member, and bearing means between the disk member and the ring member.

DESCRIPTION OF THE PREFERRED EMBODIMENT

Figure 1:
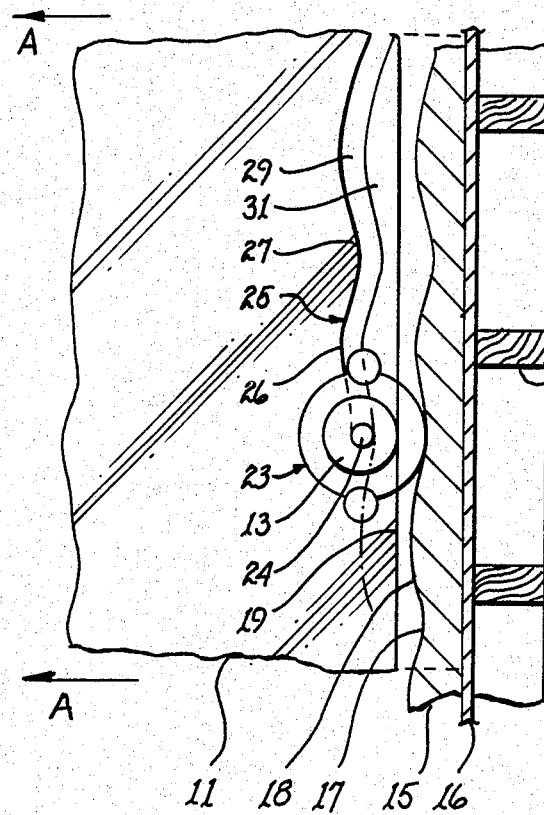
FIG. 1 is a plan view including a wall partially in section illustrating the system of the invention.
Figure 2:
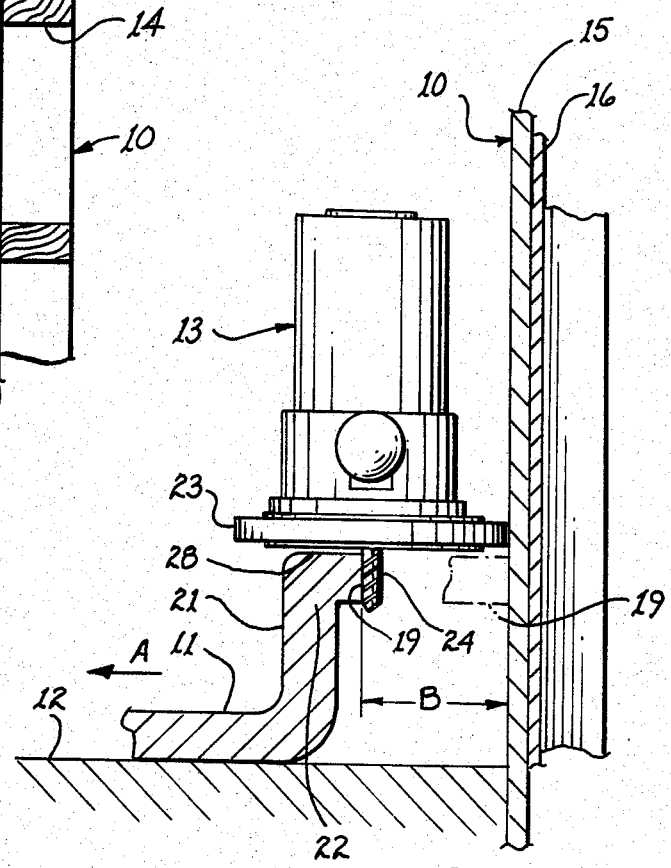
FIG. 2 is an end view, partially diagrammatic, of the system as shown in FIG. 1.

Referring to FIGS. 1 and 2, the inventive system and method is shown embodied in an arrangement of a wall 10, a countertop 11, a counter 12 and a router 13.

The wall 10, as shown, may be typical of any wall and in the instance shown comprises a typical structure having 2×4 studs 14 and a masonry, for example plaster, surface 15 formed against some backing layer, e.g., wallboard, 16 attached to the studs 14. The plaster surface 15 is shown as comprising valleys 17 and peaks 18 which are illustrated greatly exaggerated as being typical of an ordinary wall. It will be recognized that if the edge of a countertop is placed against the wall surface 15 the peaks 18 would contact the edge of the countertop leaving the valleys 17 showing except to the extent that these variations are removed by sanding, rasping or other means.

The countertop 11 as it comes from the manufacturer includes a straight edge 19 which if unchanged, would abut the peaks 18 as described. In FIG. 2 the countertop 11 shows one typical form of construction wherein there is a riser 21 extending upwardly and terminating in a horizontally extending portion 22 having the edge 19.

The router includes a guide or spacer 23 having a sufficient radius as to space the router cutting tool 24 in an appropriate position, as will be understood by those skilled in the art, to form the final edge 25 having valleys 26 and peaks 27 to interfit with the peaks 18 and valleys 17, respectively, of the wall surface 15.

Considering FIGS. 1 and 2 together the method and/or system may be understood. In the first instance the countertop 11 is placed with its edge 19 against the peaks 18 of the plaster surface 15 shown dotted in FIG. 2. This is to provide the basic alignment of the countertop edge 19 with the masonry wall 15. Then, maintaining parallelism, the countertop 11 is shifted toward the left as shown by the arrow A until the initial edge 19 is moved sufficiently away from the plaster surface 15, as determined by the radius of the guide or spacer 23 and the radius of the cutting tool 24, so that when the router spacer 23 is disposed on the upper surface 28 of the riser 21 and the spacer 23 is placed against the exposed edge of the plaster surface 15, the router cutting tool 24 will move along a kerf 29. This requires that the router cutting tool 24 remove enough material from the countertop as to leave the desired corresponding peaks 27 and the valleys 26.

It will be understood in FIG. 1 that the peaks and valleys 18 and 17, respectively, of the plaster surface 15 are greatly exaggerated and, consequently, the router cutting tool 24 need not remove as much material as shown by the piece 31. However, some material will have to be removed and the countertop must be disposed initially close enough to the cutting tool so that material can be removed while leaving sufficient material in place to form the valleys 26 and the peaks 27 in the countertop.

The shifting away from the wall of the countertop in the starting of the process is shown by the double ended arrow B in FIG. 2.

Figure 3:
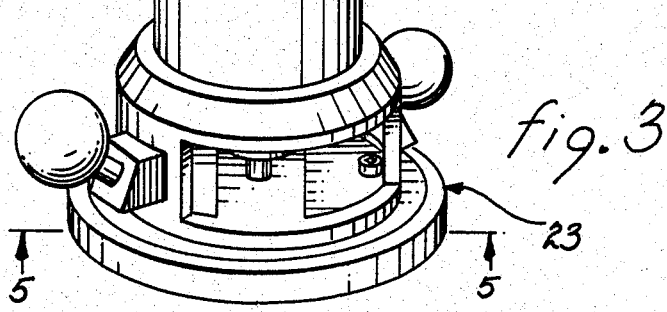
FIG. 3 is a perspective view of a router according to the invention.
Figure 4:
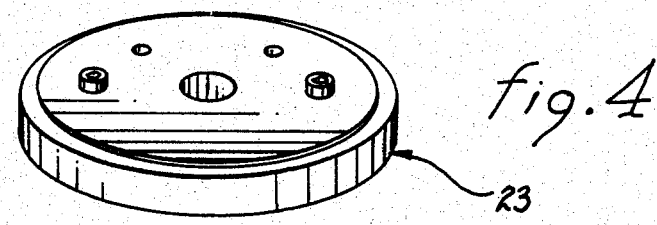
FIG. 4 is a perspective view of one component of the router of FIG. 3 showing the manner of attachment.
Figure 5:
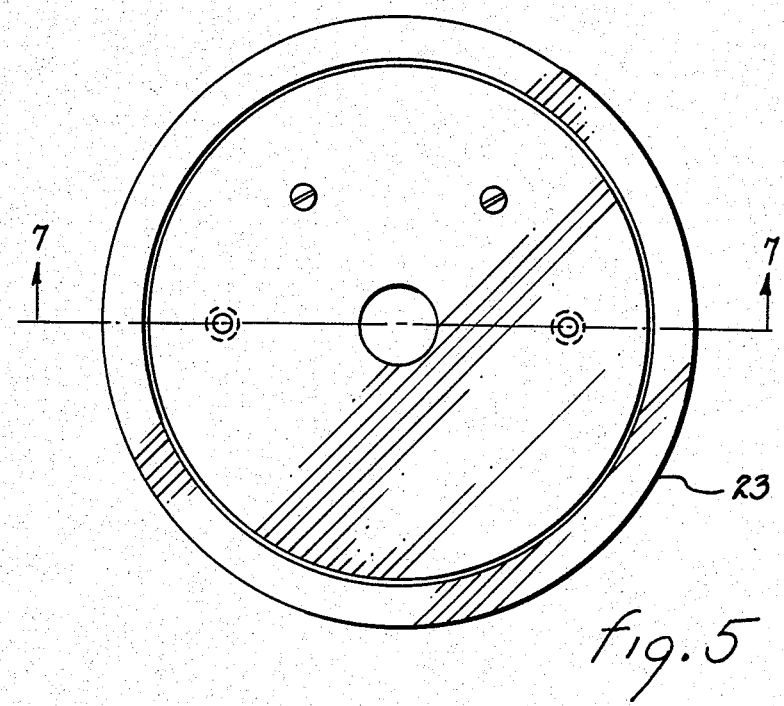
FIG. 5 is a bottom view taken substantially in the direction of the arrows 5—5 of FIG. 3.
Figure 6:
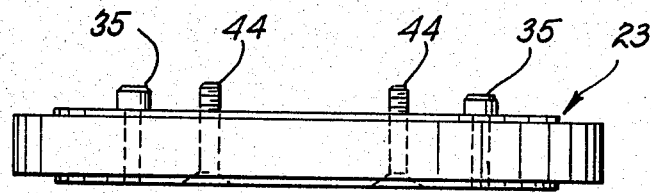
FIG. 6 is a plan view, fragmentary, of one component of the invention.
Figure 7:
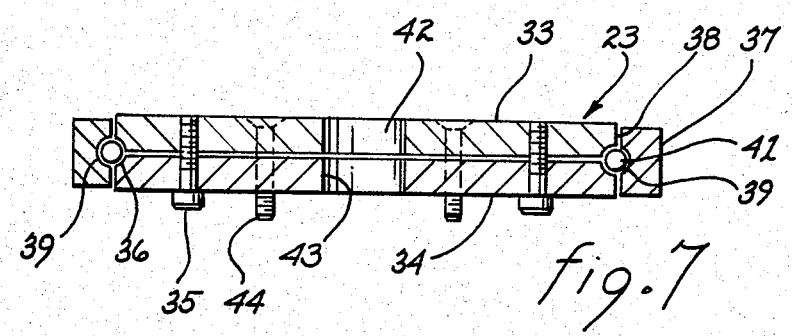
FIG. 7 is a sectional view taken substantially in the direction of the arrows 7—7 of FIG. 5.

In FIG. 3 the router 13 is shown in perspective with the spacer or guide 23 attached to the lower surface thereof in any well known manner such as by screws 32. In FIG. 4 the spacer 23 is shown in perspective below FIG. 3 in order to illustrate the manner of attachment of the router proper.

As may be visualized from FIGS. 4, 5, 6 and 7, the spacer 23 may comprise a pair of inner disks 33 and 34 identical in size, correspondingly shaped and held together by screws 35. The adjacent inner edge of the disks 33 and 34 are cut out to form a semi-circular groove 36. Exterior of the periphery of the disks 33 and 34 is a ring or rim member 37 which has a circular circumference and centrally of its inner surface 38 there is a semi-circular groove 39 which cooperates with the groove 36 to hold ball bearings 41. The two disks 33 and 34, when held together, the ball bearing 41 and the outer race 37 form the spacer 23. The race 37 may freely rotate on the ball bearings 41 about the center of the router. The disks include central openings 42 and 43 through which the router cutting tool 24 projects.

It will be noted that the combined thickness of the disks 33 and 34 is greater than the thickness of the race 37 so that when the router is disposed on the surface 28 of the countertop, the race 37 does not bear on the countertop in its rotation. Accordingly the race 37 is free to rotate and follow the contours of the wall readily and efficiently.

It is of course not essential to the invention that the race be supported by ball bearings 41 so long as the race 37 freely rotates. Other bearing structures, sleeve or otherwise, may of course be used without departing from the scope of the invention. Insofar as the method or system is concerned, the race 37 need not necessarily rotate. However, if it does not there is additional friction exerted by the edge of the spacer 23 at the point where it engages the wall. This friction may leave marks on the wall, for example, and may make it less accurate to sue the router in the manner described.

While the disks 33 and 34 are held together by the screws 35 the assembled spacer 23 may be held to the bottom of the router by the screws 44.

It will be evident that the structure as described provides a very efficient and useful tool for achieving the purposes indicated.

I claim:

1. Apparatus for attachment to a router of the type having a cutting tool centrally mounted for rotation in the bottom of said router, said apparatus permitting conformance of the surface area of a workpiece to the contour of a special adjacent parallel member and comprising:
    (a) a disk member for attachment to the bottom portion of the router and having a peripheral region;
    (b) an opening in the center of said disk member through which said cutting tool extends along a first axis;
    (c) a contour following ring movably mounted on the peripheral region of said disk member for rotation about said first axis, said contour following ring having an outer surface for contacting said adjacent parallel member, and
    (d) bearing means located between said disk member and said contour following ring for permitting relative rotation therebetween.

2. Apparatus in accordance with claim 1 wherein the peripheral region of said disk member has a bearing groove therein, said ring member has an inner peripheral region with a bearing groove therein, and said bearing means is located within said grooves.

3. Apparatus in accordance with claim 2 wherein said disk member comprising a pair of disks with cooperating groove portions in their respective peripheries.

* * * * *